Figure 1:
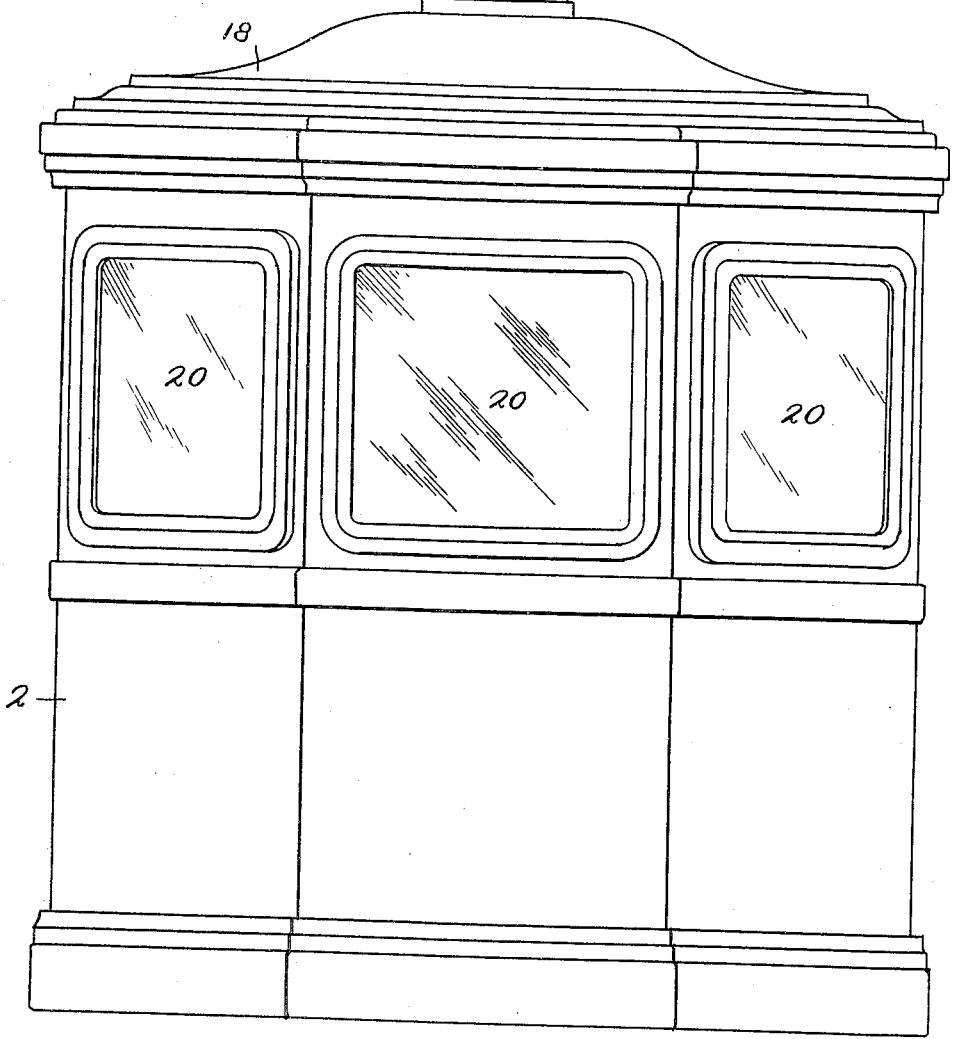

June 7, 1927.

J. C. SUNDERLAND ET AL 1,631,655

BROILING APPARATUS

Filed April 19, 1926 4 Sheets-Sheet 1

Witness:
Fred G. Fischer.

Inventors:
James C. Sunderland
and John F. Costelow,

By F. G. Fischer,
Attorney.

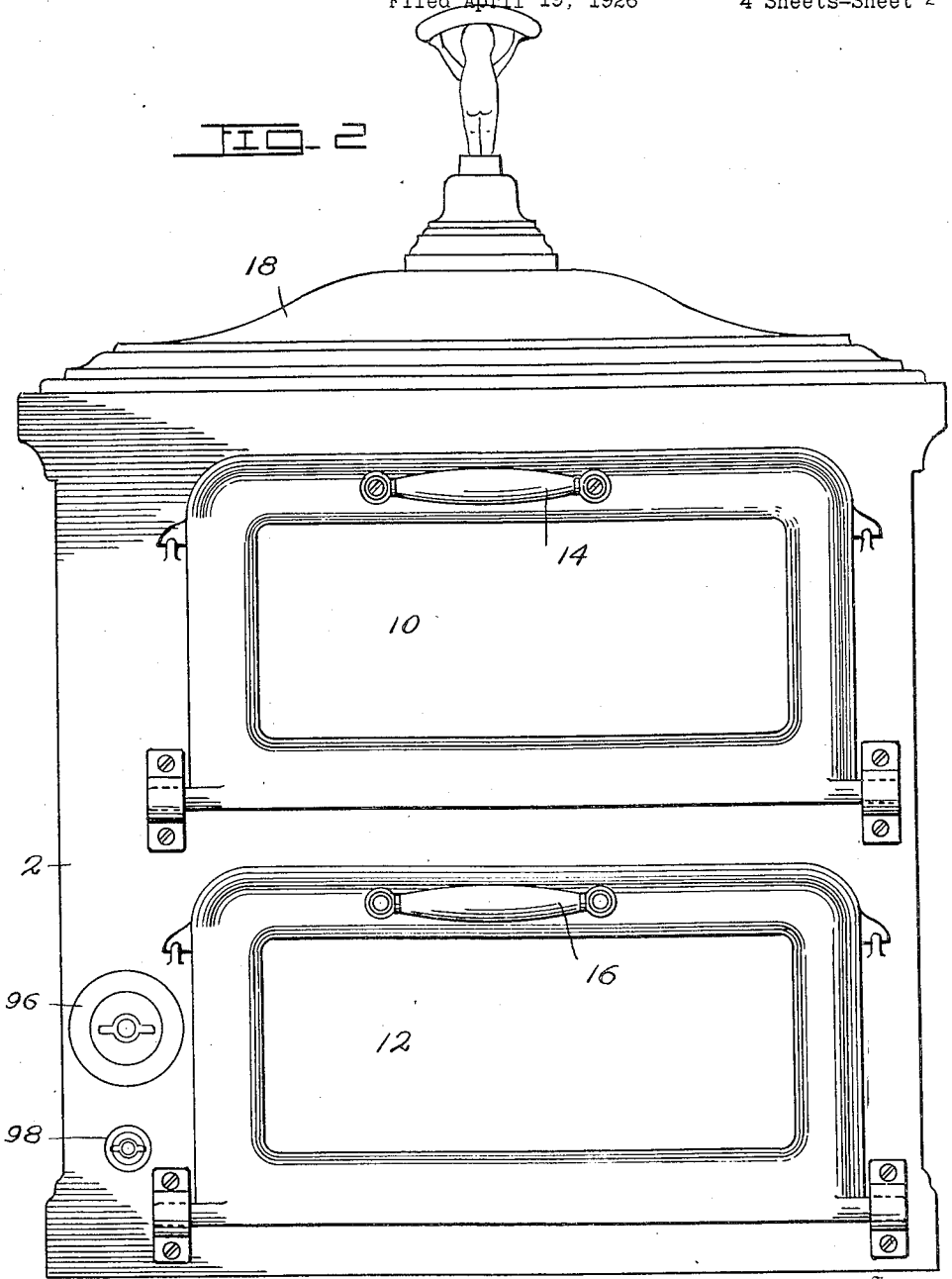

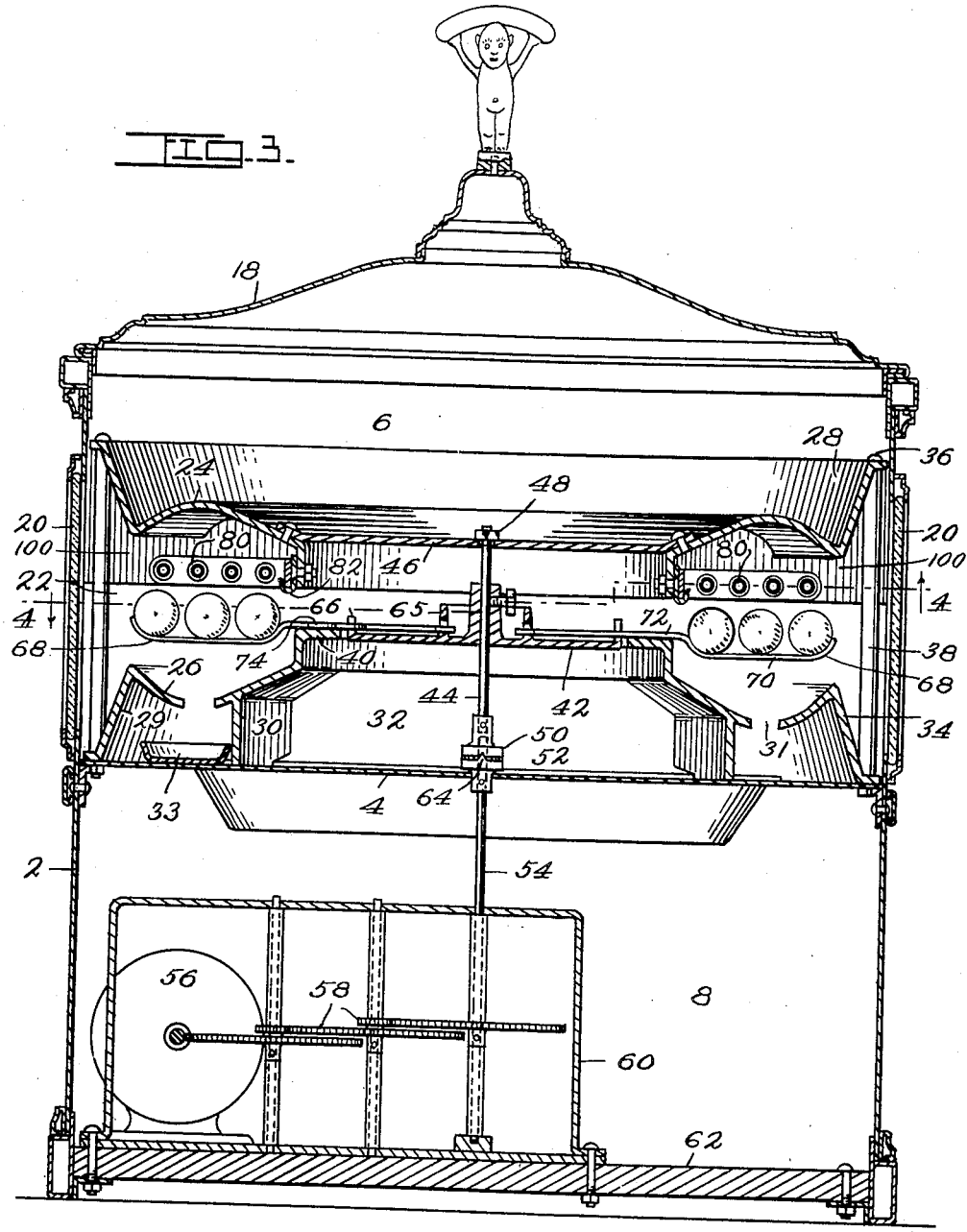

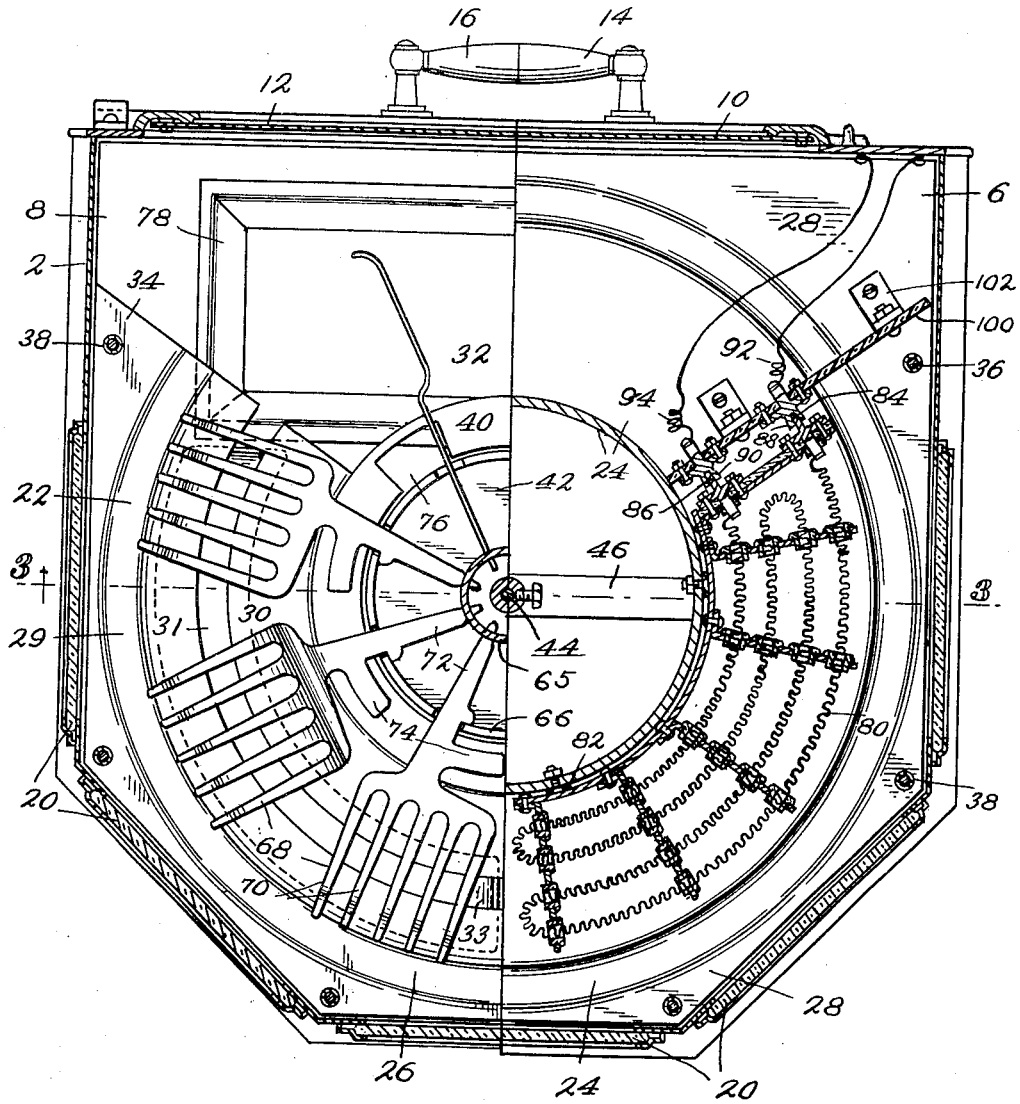

Patented June 7, 1927.

1,631,655

UNITED STATES PATENT OFFICE.

JAMES C. SUNDERLAND AND JOHN F. COSTELOW, OF KANSAS CITY, MISSOURI.

BROILING APPARATUS.

Application filed April 19, 1926. Serial No. 102,950.

Our invention relates in general to broiling apparatus and appertains more particularly to apparatus for broiling sausages, and one object is to provide an oven in which both direct and reflected heat is employed for evenly and thoroughly cooking said sausages.

A further object is to provide rotary carriers for conducting the sausages around within the oven until thoroughly broiled and then automatically discharging said sausages from the oven before they can become scorched or overdone.

Another object of the invention is to provide a sanitary and attractive broiler of compact form but capable of broiling a relatively large number of sausages during each revolution of the sausage carriers, which latter do not have to be stopped either for receiving or discharging the sausages.

In order that the invention may be fully understood, reference will now be had to the accompanying drawings, in which:

Fig. 1 is a front elevation of the apparatus.
Fig. 2 is a rear elevation of the apparatus.
Fig. 3 is a vertical cross section on line 3—3 of Fig. 4.
Fig. 4 is an irregular horizontal section on line 4—4 of Fig. 3, the left half looking downwardly as indicated by the arrow at the left, and the right half looking upwardly as indicated by the arrow at the right of said section line.

Referring in detail to the different parts, 2 designates a casing divided by a horizontal partition 4 into upper and lower compartments 6 and 8 to which access may be had through doors 10 and 12, hinged to the rear portion of said casing 2 and provided with handles 14 and 16, respectively. Access may also be had to the upper compartment 6 by a removable lid 18. The upper portion of the casing 2 is provided with a number of glass panels 20 through which the sausages being broiled and the upper mechanism of the compartment 6 may be viewed.

22 designates an annular oven arranged within the upper compartment 6 and consisting of upper and lower reversely disposed convex sections 24 and 26. The upper oven section 24 is provided with an upwardly and outwardly extending flange 28 which fits snugly within the upper portion of the casing 2.

The lower oven section 26 is divided into outer and inner parts 29 and 30, respectively, by a segmental slot 31 and has an opening 32 in its rear portion for a purpose which will hereinafter appear. A segmental drip pan 33 is placed upon the partition 4 at a point beneath the slot 31, to catch the drippings from the sausages during the broiling process. The outer portion 29 of the oven section 26 has a downwardly and outwardly extending flange 34 which extends into the interior front and side portions of the casing 2, but is spaced from the rear wall of said casing and rests upon the partition 4. The upper section 24 and the outer portion 29 of the oven are secured by bolts 36, which extend through the flanges 28 and 34 and are secured to the partition 4. Spacing sleeves 38 on the bolts 36 support the upper section 24 above the lower section 26.

The inner portion 30 of the lower section 26 is secured upon the partition 4 and is provided at its upper portion with an annular flange 40 surrounding a rotary table 42 fixedly mounted upon a vertical shaft 44 extending upwardly through a bar 46 and provided at its upper end with a nut 48 adapted to rotate upon said bar 46. The lower end of the shaft 44 is provided with a fixedly mounted clutch member 50, which coengages a clutch member 52 fixedly mounted upon the upper end of a shaft 54 driven by an electric or other suitable motor 56 through the intermediary of a speed reduction gear train 58 mounted in a frame 60 arranged within the lower compartment 8 and secured to the floor 62 of the casing 2. The clutch members 50 and 52 are not rigidly connected so that in the event the shaft 48 should for any reason be prevented from rotating with the shaft 44 no damage will result to the mechanism as the coupling 50 may move upwardly out of engagement with the V-shaped teeth 64 on the lower coupling 52.

The rotary table 42 has upwardly projecting concentric flanges 65 and 66 in which a plurality of sausage carriers 68 are tiltably mounted. Each sausage carrier 68 consists of a plurality of united fingers 70 carried by a shaft 72 which is rockably mounted in the flanges 65 and 66. As shown by Fig. 4, the shaft 72 is arranged closer to the front finger than to the rear finger 70, so as to unbalance the carrier which is further unbalanced by an arm 74 projecting rearwardly from the shaft 72. The arms 74 travel upon the annular flange 40 of the lower inner oven portion 30 and hold the respective carriers in normal position for supporting the sausages being broiled until said arms reach an opening 76 in the rear portion of the flange 40, through which they successively drop and assist in causing the unbalanced carriers to dump the broiled sausages through the opening 32 into an underlying tray 78 supported by the partition 4. As the arms 74 move upwardly out of the opening 76 they right the carriers 68, so that the latter may receive another supply of sausages for broiling.

80 designates two sets of electrical heating elements arranged in the upper portion of the oven 22 and beneath which the sausages are conducted by the carriers 68. Said heating elements 80 are removably supported upon hooks 82 secured to the interior of the upper oven section 24. Each heating element has positive and negative terminals 84 and 86, which, for the purpose of easy assemblage, fit in sockets 88 and 90 connected by wire conductors 92 and 94, respectively, to a switch 96 located on the rear wall of the casing 2 adjacent to a switch 98 for controlling the circuit, not shown, of the motor 56. Current from any suitable source may be led to the switches 96 and 98 over wire conductors, not shown. The sockets 88 and 90 are connected to insulating panels 100 secured within the upper oven section 24 by brackets 102.

The operation briefly stated is as follows: The switch 96 is turned on to admit current to the heating elements 80, which in turn heat the oven 22. The switch 98 is also turned on to admit current to the motor 56, which drives the rotary table 42 with the carriers 68 through the intermediary of the intervening gearing. The door 10 to the upper compartment 8 is opened and sausages are placed upon the carriers 68 as they successively appear at the opening 32 in the lower portion of the oven. The carriers 68 conduct the sausages around in the oven 22 until the arms 74 successively drop into openings 76, whereupon the carriers dump the sausages upon the underlying tray 78. As the sausages are carried beneath the heating elements 80 they are broiled by direct heat and also by heat reflected from the interior upper and lower convex portions of the oven 22, so that by the time the sausages are dumped they are thoroughly and evenly cooked. By arranging the carriers 68 to automatically dump at the opening 32, all danger of the sausages becoming scorched from remaining in the oven too long is overcome, and after being deposited in the tray 78 they are kept warm by heat from the oven until served. By the time the sausages reach a point above the drip pan 33 they are broiled sufficiently to cause the grease to drip upon the lower portions 29 and 30 of the oven, which being hot, causes the drippings to run through the slot 31 and fall into said drip pan 33 instead of remaining in the oven to create smoke. All of the oven sections may be of polished metal or their interior surfaces may be enameled for the purpose of readily deflecting the heat from the heating elements 80 against all portions of the sausages, thereby evenly and thoroughly broiling the same so that they will not have to be turned over upon the carriers 68.

While we have referred specifically to the broiling of sausages, it is to be understood that all kinds of meats may be broiled, or bread may be toasted.

From the foregoing description it is apparent that we have provided an apparatus embodying the advantages above pointed out, and while we have shown and described the preferred construction, combination and arrangement of parts, we reserve the right to all such changes and modifications as properly fall within the spirit and scope of the invention as claimed.

Having thus described our invention, what we claim and desire to secure by Letters Patent, is:

1. In an apparatus of the character described, an oven having an opening in its lower portion, an unbalanced carrier having horizontally disposed fingers for supporting food and arranged to travel around in said oven and dump the food at said opening, and means for restoring and retaining said carrier in normal position throughout the remainder of each revolution.

2. In an apparatus of the character described, an annular oven having an annular opening in its inner periphery, a rotary table surrounded by said oven, and radially disposed sausage carriers mounted upon said table and extending into the oven through said annular opening.

3. In an apparatus of the character described, an oven having an opening in its lower portion, a casing enclosing said oven, a receptacle in said casing and located beneath the oven opening, and an unbalanced rotary carrier for supporting food within said oven and dumping it into said receptacle through the oven opening.

4. In an apparatus of the character described, an oven having relatively large and small openings, heating means for said oven, a carrier for supporting food within said oven and dumping it through the large opening, mechanism for rotating said carrier, and unbalancing means which travels around with said carrier and enters the small opening in the oven to cause the carrier to dump the food.

5. In an apparatus of the character described, an oven having relatively large and small openings, a plurality of rotary carriers for supporting food within said oven and dumping it through the large opening, and unbalancing elements on said carriers which enter the small opening in the oven to cause the carriers to dump the food.

6. In an apparatus of the character described, an annular oven, a rotary table surrounded by said oven, a horizontally-disposed shaft arranged to rock axially upon said table, horizontally-disposed fingers connected to said shaft and projecting through an annular opening into the oven, and means for rocking said shaft during each revolution of the table.

7. In an apparatus of the character described, a sausage carrier consisting of a plurality of horizontally-disposed fingers, a horizontally-disposed shaft secured to said fingers, and an unbalancing member for rocking said shaft axially.

8. In an apparatus of the character described, an oven consisting of reversely disposed convex upper and lower sections having reflecting inner surfaces and an opening in the lower section, and a drip pan located beneath said opening.

In testimony whereof we affix our signatures.

JAMES C. SUNDERLAND.
JOHN F. COSTELOW.